United States Patent Office 3,562,338

Patented Feb. 9, 1971

3,562,338

PROCESS FOR PRODUCING 4,4'-BIS(2,6 DIHYDROCARBYLPHENOL)

Edward F. Zaweski, Royal Oak, Mich., assignor to Ethyl Corporation, New York, N.Y., a corporation of Virginia No Drawing. Continuation-in-part of application Ser. No. 553,024, May 26, 1966. This application June 21, 1967, Ser. No. 647,614

Int. Cl. C07c *39/12, 49/62*

U.S. Cl. 260—620 19 Claims

ABSTRACT OF THE DISCLOSURE

Reaction of a phenol such as 2,6-di-tert-butylphenol with oxygen in the presence of an alkali metal hydroxide followed by reaction of the product formed with additional phenol, preferably the same type phenol, in a substantially oxygen-free system yields a bisphenol (e.g., 4,4'-bis(2,6-di-tert-butylphenol)). Product quality and yields are improved if the reaction product is acidified after the bisphenol has formed, but before allowing the reaction product to contact oxygen.

This application is a continuation-in-part of application Ser. No. 553,024, filed May 26, 1966, now abandoned.

BACKGROUND

This invention relates to a process for making bisphenols. In particular, this invention relates to a process for making 4,4'-bis(2,6-di-hydrocarbylphenols).

Bisphenols are useful as bactericides, chemical intermediates, copolymers, and especially as antioxidants. For example, 4,4'-bis(2,6-di-tert-butylphenol) is an excellent antioxidant in a broad range of organic materials. It can be used to stabilize such materials as animal and vegetable fats or oils, gasoline, lubricants, polyolefins such as polyethylene and polypropylene, and both natural and synthetic rubber. It exerts its protective effect by merely incorporating it uniformly throughout the organic material in small amounts. Concentrations of from about 0.1 to 1 weight percent usually provide adequate antioxidant protection.

In the past, the manufacture of useful bisphenols was an involved process. For example, in U.S. 2,785,188, a process for preparing these compounds is disclosed which requires first the halogenation of the phenol reactant followed by reaction of the halophenol with oxygen in the presence of copper and alkali. This forms a diphenoquinone and a halogen salt. The diphenoquinone is recovered and then hydrogenated to the desired bisphenol.

In a more recent process, disclosed in U.S. 3,306,875, the need to halogenate the starting phenol is eliminated and the oxidation catalyst employed to form the diphenoquinone intermediate is a copper salt-amine complex. Here again it is necessary to recover the diphenoquinone formed in the oxidation step and to reduce it in a second reaction.

From this, it is seen that the main problems encountered in prior art methods of preparing bisphenols were (1) the necessity of conducting two distinct steps—oxidation of a phenol to a diphenoquinone employing one catalyst and reduction to a bisphenol employing a different catalyst, and (2) the necessity of recovering the diphenoquinone formed in the oxidation step before proceeding with the reduction step. The present invention solves these problems by providing a single catalyst process for converting phenols to bisphenols that does not require the isolation of any intermediate products.

An object of this invention is to provide an economical process for producing bisphenols. A further object is to provide a process for making 4,4'-bis(2,6-di-hydrocarbylphenols). A still further object is to provide an economical process for making 4,4'-bis(2,6-di-tert-butylphenol) from 2,6-di-tert-butylphenol.

A preferred embodiment of this invention comprises an integrated process for making 4,4'-bis(2,6-di-hydrocarbylphenols) comprising (A) reacting one mole equivalent of a first phenol having the formula:

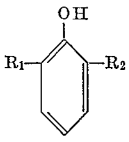

(I)

wherein $R_1$ and $R_2$ are radicals selected from the group consisting of alkyl radicals containing from 1 to 20 carbon atoms, aryl radicals containing from 6 to 20 carbon atoms, aralkyl radicals containing from 7 to 20 carbon atoms, and cycloalkyl radicals containing from 6 to 20 carbon atoms, with an oxygen-containing gas in the presence of an alkali metal hydroxide at a temperature of from about 30 to 300° C. until substantially all of said first phenol has been oxidized; (B) adding to the reaction mixture produced by step (A) about one mole equivalent of a second phenol having the formula:

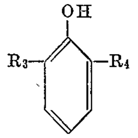

(II)

wherein $R_3$ and $R_4$ are selected from the same group as $R_1$ and $R_2$; (C) heating the mixture to a temperature of from about 100 to 350° C. in the substantial absence of oxygen and maintaining the mixture at this temperature until a reaction product containing a substantial amount of a 4,4'-bis(2,6-di-hydrocarbylphenol) is formed; and (D) recovering the bisphenol from the reaction product.

Generally, a pure product is desired, in which case the above first phenol and second phenol are the same compound. Some examples of phenols that are useful in the process are 2,6-diisopropylphenol,
6-tert-butyl-o-cresol,
2,6-di-sec-butylphenol,
2,6-di(2,4,4-trimethyl-2-pentyl)phenol,
6-sec-eicosyl-o-cresol,
2-butyl-6-cyclohexylphenol,
6-cyclohexyl-o-cresol,
6-($\alpha$-methylbenzyl)-o-cresol,
2,6-di($\alpha$-methylbenzyl)phenol,
6($\alpha$,$\alpha$-dimethylbenzyl)-o-cresol,
2-sec-butyl-6-($\alpha$-methylbenzyl)phenol,
6-phenyl-o-cresol,
2-(3,5-di-tert-butylphenyl)-6-tert-butylphenol, and
6-isopropyl-o-cresol.

The most preferred first and second phenol is 2,6-di-tert-butylphenol.

The process is readily conducted by merely placing the first phenol in a reaction vessel. Although a solvent is not required, the use of one is generally preferred. Useful solvents comprise hydrocarbons having boiling points of from about 80 to 200° C. The more preferred solvents are the aromatic hydrocarbons such as benzene, toluene, xylene, mesitylene, and the like.

A catalytic amount of an alkali metal hydroxide is added to the reaction vessel containing the first phenol. The most preferred catalyst is potassium hydroxide. The amount should be sufficient to catalyze the oxidation of the first phenol at a reasonable rate. Good results are obtained with from about 0.2 to 2 moles of catalyst per mole of first phenol. A preferred amount of potassium hydroxide is from about 0.2 to 0.4 mole per mole of first phenol.

The first stage of the reaction is conducted at a temperature sufficient to obtain a reasonable reaction rate. The higher the temperature, the faster the rate. Generally, good oxidation results are obtained at a temperature of from about 30 to 300° C. A preferred temperature range during the oxidation stage of the reaction is from 50 to 100° C.

Oxidation of the first phenol is accomplished by passing an oxygen-containing gas through the reaction mass. Although other oxygen-containing gases or even oxygen itself can be used, the preferred oxidant is air.

The oxidation can be conducted at atmospheric pressure or at higher pressures. Preferably, the oxidation is conducted under moderate pressures because this results in a faster reaction. A preferred pressure range is from atmospheric to about 1000 p.s.i.g. A most useful range is from about 200 to 500 p.s.i.g.

The oxidation step is continued until substantially all of the first phenol has been oxidized. The progress of the reaction can readily be monitored by withdrawing samples and analyzing them by gas chromatography for the disappearance of the first phenol. When the reaction is conducted at about 70° C. and under 300 p.s.i.g. it is generally complete in about 45 minutes to 2 hours.

After the first phenol has been substantially oxidized, passage of oxygen-containing gas through the system is discontinued. If the reaction is under pressure it is then vented. The second phase of the process is conducted in a substantially oxygen-free system. The vapor space above the liquid in the reaction vessel may be purged with an inert gas such as nitrogen at this time, but this is generally not required because there is very little oxygen present in this residual gas.

A second phenol is added to the reaction vessel in an amount about equal on a mole basis to the quantity of first phenol originally added. As stated previously, it is preferred that the second phenol is actually the same as the first phenol as this results in a single product. However, this is not necessary if mixtures are satisfactory. In practice, about 0.9 to 1.1 mole of the second phenol per mole of first phenol have been used with good results.

The reaction vessel is then merely sealed and the mixture heated. This is one of the valuable features of the process setting it apart from prior methods. It is not necessary to recover any intermediate product between the first and second stages in the process because the same catalyst catalyzes both steps. The mixture is heated to a temperature high enough to give a reasonable reaction rate, but not so high as to cause degradation of the product. A useful temperature range is from about 100 to 350° C. A preferred temperature range is from about 200 to 300° C.

The heating is continued until the yield of the desired bisphenol is at a maximum. Unduly long reaction times are not recommended because this leads to product degradation and lowers yields. Generally, good results are obtained by heating for about 1 to 4 hours, depending to some extent on the temperature. At higher temperatures a shorter reaction time is used, and at lower temperatures a longer reaction time is required. At 250° C., the yield is generally optimized in about 1.5 hours.

Following this treatment, the reaction product contains a substantial amount of a 4,4'-bis(2,6-di-hydrocarbylphenol). It is cooled and the product can be recovered by merely discharging the reaction vessel and allowing the product to crystallize. However, I have found that product purity and yield can be significantly improved by adding enough acid to at least neutralize the alkali metal hydroxide catalyst prior to allowing the reaction product to contact oxygen. This is readily accomplished by either adding an acid directly to the reaction product in the reaction vessel or by discharging the reaction product into an acid avoiding contact with air.

The preferred acids used in the neutralization step are the mineral acids, lower organic acids containing about 1 to 3 carbon atoms, or aryl sulfonic acids. Examples of suitable acids are sulfuric, hydrochloric, phosphoric, formic, acetic, propionic, p-toluene sulfonic, sulfonated polystyrene ion exchange resin, and the like. The preferred acids are phosphoric and acetic.

The amount of acid used should be at least sufficient to neutralize the alkali metal hydroxide catalyst. Preferably, a slight excess of acid is employed. A good range is from about 1 to 1.5 equivalents of acid per equivalent of base. For example, when acetic acid is used, 1 to 1.5 moles of acetic acid are employed per mole of alkali metal hydroxide. When phosphoric acid is used only 0.5 to 0.75 mole per mole of base are required since phosphoric acid has two readily available protons.

The acid is usually employed as an aqueous solution except in the case of the sulfonated ion exchange resin, which is not water soluble. In the latter case, the reaction mass can merely be discharged through a bed of the acidified ion exchange resin.

After the catalyst has been neutralized, the product is easily recovered by washing the reaction mass with water and crystallizing the bisphenol from a solvent such as toluene. If the reaction is conducted in a solvent, merely cooling the reaction mass will cause the bisphenol to crystallize. If an impure product can be tolerated, the crude reaction mass can be used without further purification, or if a solvent has been used this can be merely distilled off.

In my previous application, Ser. No. 553,024, filed May 26, 1966, having the same assignee, I described a one-step process for making bisphenols comprising reacting a phenol with a diphenoquinone in the presence of an alkali metal hydroxide at a temperature of from about 100 to 500° C. in a substantially oxygen-free system. The useful phenols have at least one position ortho or para to the phenolic hydroxyl group, unsubstituted except for hydrogen. I have now found that the product purity and yield of this one-step process are also greatly improved by use of the acidification step, described in the above integrated process, after the reaction steps are complete, but prior to allowing the reaction product to contact oxygen. Hence, this represents another embodiment of the invention. In this embodiment, the phenol preferably has the formula:

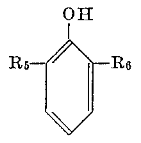

(III)

wherein $R_5$ and $R_6$ are radicals selected from the group consisting of alkyl radicals containing from 1 to 20 carbon atoms, aryl radicals containing from 6 to 20 carbon atoms, aralkyl radicals containing from 7 to 20 carbon atoms and cycloalkyl radicals containing from 6 to 20 carbon atoms; and the diphenoquinone has the formula:

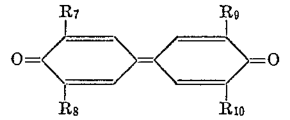

(IV)

wherein $R_7$, $R_8$, $R_9$ and $R_{10}$ are selected from the same group as $R_5$ and $R_6$.

In a more preferred embodiment, the phenol reactant has Formula III wherein $R_5$ and $R_6$ are the same as above, and the diphenoquinone reactant has Formula IV wherein $R_7$, $R_8$, $R_9$ and $R_{10}$ are the same as above, the catalyst is potassium hydroxide and the acid employed in the acidification step is phosphoric acid or acetic acid.

In a still more preferred embodiment of the invention, $R_5$, $R_7$ and $R_9$ in Formulae III and IV are alpha-branched alkyl radicals containing from 3 to 20 carbon atoms, alpha-branched aralkyl radicals containing from 8 to 20 carbon atoms or cycloalkyl radicals containing from 6 to 20 carbon atoms, and $R_6$, $R_8$ and $R_{10}$ are the same as above.

In a highly preferred embodiment, $R_5$, $R_6$, $R_7$, $R_8$, $R_9$ and $R_{10}$ are either tert-alkyl radicals containing from 4 to 20 carbon atoms or alpha-branched aralkyl radicals containing from 8 to 20 carbon atoms.

In a most preferred embodiment, $R_5$, $R_6$, $R_7$, $R_8$, $R_9$ and $R_{10}$ are tert-butyl radicals and the catalyst is potassium hydroxide. In other words, the phenol reactant is 2,6-di-tert-butylphenol and the diphenoquinone reactant is 3,3',5,5'-tetra-tert-butyldiphenoquinone.

The preferred 2,6-di-hydrocarbylphenol starting materials are readily available or can be made by the process described by Ecke et al. in U.S. 2,831,898. In essence, this process comprises the ortho alkylation of phenol with an olefin in the presence of an aluminum phenoxide catalyst.

The diphenoquinone starting materials can be made by the oxidative coupling of mononuclear phenols in which the position para to the hydroxyl group is unsubstituted. A suitable method is shown by M. C. Kharasch and B. S. Joshi in J. Org Chem. 22, 1439 (1957).

The stoichiometry of the one-step process requires two moles of the phenol per mole of the diphenoquinone. In practice, from about 1.75 to 3 moles of the phenol is employed per mole of the diphenoquinone. A more preferred range is from about 1.9 to 2.5, and a most preferred range is from about 2 to 2.1 moles of the phenol per mole of the diphenoquinone.

Suitable catalysts are the alkali metal hydroxides. Some examples of these are lithium hydroxide, cesium hydroxide, sodium hydroxide and potassium hydroxide. Of these, the more preferred are sodium hydroxide or potassium hydroxide, and the most preferred catalyst is potassium hydroxide. The quantity of catalyst should be sufficient to catalyze the reaction at a reasonable rate. A useful range is from 0.2 to 2 moles of the catalyst per mole of the phenol. A more preferred range is from 0.4 to 1 mole of catalyst per mole of the phenol.

The one-step process can be carried out at a temperature at which it proceeds at a reasonable rate, but below the temperature at which the reactants or products suffer thermal degradation. A useful temperature range is from 100 to 500° C. A preferred temperature range is from about 100 to 350° C. A more preferred range is from about 200 to 300° C., and a most preferred temperature range is from 225 to 275° C.

The one-step process does not require at the start a completely inert atmosphere, but should be conducted substantially in the absence of oxygen. By this is meant that oxygen-containing gas such as air should not be allowed to enter the reaction mixture or the vapor phase above it. The slight amount of oxygen present in the atmosphere and trapped above the reaction at the start will not detrimentally affect the process, but circulation of further oxygen-containing gas should be avoided since this will result in oxidation of both the phenol and the bisphenol products to the diphenoquinone and lower the yield of the desired bisphenol.

The one-step process can be conducted with or without a solvent. When a solvent is employed it should be substantially inert to the reactants and products. Use of a solvent is preferred because it makes recovery of the products easier. Preferred solvents are hydrocarbons such as isooctane, kerosene, and the like. Most preferred solvents are the aromatic hydrocarbons such as benzene, toluene, mesitylene, naphthalene, and the like. A highly preferred solvent is xylene.

The process is normally conducted at atmospheric pressure, although if temperatures above the boiling point of the reactants or solvent are employed, the reaction should be conducted under whatever vapor pressure is exerted at the reaction temperature in order to avoid loss through evaporation.

The process should be carried out for a time sufficient to optimize the yield of the desired bisphenol. The reaction time should not be extended unreasonably as this will lead to decomposition of the product. The length of time for optimum yield will depend to some extent on the reaction temperature. In the most preferred temperature range optimum yields are usually obtained in from about 15 minutes to 4 hours. A more preferred reaction time is from about 30 minutes to one hour.

The bisphenol product can be recovered by methods well known in the art. For example, when the reaction is conducted in a solvent, the solvent can be merely cooled and, in most cases, the bisphenol product will crystallize. If the product does not crystallize the solvent can be removed by distillation, leaving a crude mixture containing predominantly the bisphenol product. If the mixture is not useable in this crude form it may be purified by crystallization from other suitable solvents such as alcohol, ethers, and the like.

As in the foregoing integrated process, I have found that both product quality and yields are improved by adding enough acid to at least neutralize the reaction product after the desired bisphenol has formed and before allowing the reaction product to contact oxygen. As previously, sufficient acid is used to neutralize the catalyst, but preferably a small excess is employed so that the reaction product is rendered slightly acid. The preferred type, quantity and method of addition of the acids are the same as previously described for the integrated process.

The following examples illustrate the foregoing embodiment of this invention. All parts are parts by weight unless otherwise specified.

Example 1

To a pressure reaction vessel equipped with stirrer, air delivery tube, heating means, thermocouple, pressure gauge, and venting valve was added a solution of 103 parts of 2,6-di-tert-butylphenol in 345 parts of toluene. To this was added 6.5 parts of 86 percent potassium hydroxide. The vessel was then sealed and, while stirring, heated to 70° C. Air was passed through the liquid phase in the vessel at a rate such that the volume of air under standard conditions passed into the vessel each minute was about 6 times the volume of the liquid reactants in the vessel. Spent air was vented from the vapor phase in the reaction vessel at a controlled rate such that the pressure within was maintained at about 300 p.s.i.g. This was continued for 2 hours. Following this air flow and heating was stopped and the vessel allowed to cool. When cooled, the vessel was vented and purged with nitrogen. Then 103 parts of 2,6-di-tert-butylphenol was added and the reaction mixture was heated to 250° C. and maintained at this temperature for one hour. Following this, it was cooled to 60° C. and 4 parts of phosphoric acid added. The vessel was discharged and the liquid cooled to about 10° C. A crystalline product formed (141 parts) which was removed by filtration and analyzed by infrared to be 4,4'-bis(2,6-di-tert-butylphenol).

Example 2

In this example, the pressure vessel described in Example 1 was charged with 103 parts of 2,6-di-tert-butylphenol and 310 parts of the solvent filtrate recovered from Example 1. To this was added 13 parts of 86 percent potassium hydroxide. The vessel was sealed and, while stirring, heated to 70° C. Air was passed through the liquid phase at this temperature over a 75 minute period while maintaining the pressure at 300 p.s.i.g. Following this, the vessel was vented, purged with nitrogen, and charged with an additional 138 parts of 2,6-di-tert-butylphenol. It was then sealed and heated to 250° C. and maintained at this temperature for one hour. It was then cooled to 85° C. and a solution of 9.3 parts of phosphoric acid in 50 parts of water added. The vessel was discharged and the liquid reaction product cooled to about 10° C. A white crystalline solid (198 parts) precipitated and was recovered by filtration and identified by infrared analysis to be 4,4'-bis (2,6-di-tert-butylphenol).

The above procedure described in Examples 1 and 2 may be used to produce a wide variety of bisphenols by merely changing the starting phenol reactants. For example, the following table lists a phenol reactant followed by the corresponding bisphenol product resulting from the above process.

| Phenol reactant: | Bisphenol product |
|---|---|
| 2,6-diisopropylphenol | 4,4'-bis(2,6-diisopropylphenol). |
| 6-(α-methylbenzyl)-o-cresol. | 4,4'-bis[2-methyl-6-(α-methylbenzyl)phenol]. |
| 2,6-di-sec-butylphenol | 4,4'-bis(2,6-di-sec-butylphenol). |
| 6-tert-butyl-o-cresol | 4,4'-bis(2-methyl-6-tert-butylphenol). |
| 2,6-dimethylphenol | 4,4'-bis(2,6-dimethylphenol). |
| o-Tert-butylphenol | 4,4'-bis(2-tert-butylphenol). |
| o-Cresol | 4,4'-bis(2-methylphenol). |
| 2,6-dicyclohexylphenol. | 4,4'-bis(2,6-dicyclohexylphenol). |
| 6-sec-eicosyl-o-cresol | 4,4'-bis(2-methyl-6-sec-eicosylphenol). |
| 2,6-diphenylphenol | 4,4'-bis(2,6-diphenylphenol). |

Example 3

In the reaction vessel described in Example 1 was placed 103 parts of 2,6-di-tert-butylphenol, 13 parts of 86 percent potassium hydroxide and 345 parts of toluene. The vessel was sealed and, while stirring, heated to 70° C. Air was passed through the liquid reaction mixture for one hour while maintaining the vessel pressure at 300 p.s.i.g. The vessel was then vented and purged with nitrogen. Following this, 155 parts of 2,6-di-tert-butylphenol was added and the vessel sealed. While stirring, the vessel was heated to 250° C. It was maintained at this temperature for 45 minutes and then cooled to 150° C. The vessel was then discharged and the reaction product washed with water. The product was filtered, yielding 139 parts of 4,4'-bis(2,6-di-tert-butylphenol).

Example 4

In a pressure reaction vessel equipped with air delivery tube, stirrer, thermocouple, and vent valve and reflux condenser is placed 103 parts of 2,6-di-tert-butylphenol, 345 parts toluene and 13 parts of 86 percent potassium hydroxide. Air is passed through the liquid for 4 hours at 80° C. and at atmospheric pressure. Then an additional 103 parts of 2,6-di-tert-butylphenol is added. The vessel is purged with nitrogen, sealed, and heated to 100° C. for 4 hours. It is then cooled and a solution of 15 parts of 85 percent phosphoric acid in 100 parts of water is added prior to allowing the reaction product to contact oxygen. The vessel is then discharged and the product, 4,4'-bis (2,6-di-tert-butylphenol), recovered.

In the above example, other alkali metal catalysts can be employed such as sodium hydroxide, cesium hydroxide, lithium hydroxide, and the like. Also, other solvents can be used such as benzene, xylene, mesitylene, naphthalene, and the like.

Example 5

To a pressure reaction vessel equipped with stirrer, temperature measuring means and heating means was added 90.6 parts of 2,6-di-tert-butylphenol, 81.6 parts of 3,3',5,5'-tetra-tert-butyl-diphenolquinone and 29 parts of 85 percent potassium hydroxide pellets. The vessel was flushed with nitrogen and sealed. It was heated to 250° C. while stirring, and kept at this temperature for 30 minutes. The vessel was then cooled and opened. The contents had solidified. They were removed and dissolved in diethyl ether and the ether solution washed with water and with dilute aqueous hydrochloric acid. The ether was evaporated, leaving a solid residue which was recrystallized from denatured alcohol, giving 137.3 parts of a slightly yellow solid, melting at 183–5° C., identified as 4,4'-bis(2,6-di-tert-butylphenol).

Example 6

To the reaction vessel of Example 5 is added 2 mole parts of 2,6-di(α-methylbenzyl)phenol, one mole part of 3,3',5,5'-tetra-(α-methylbenzyl)diphenoquinone, 40 parts of sodium hydroxide and 500 parts of xylene. The reaction vessel is heated to 275° C. while stirring, and maintained at this temperature for 30 minutes. The vessel is then cooled to 100° C. and discharged. On further cooling, 4,4'-bis[2,6-di(α-methylbenzyl)phenol] is recovered in good yield.

Similar results are obtained using equal mole amounts of other phenols and diphenoquinones. Thus, the use of 2-methyl-6-tert-butylphenol and 3,3'-dimethyl-5,5'-tert-butyl-diphenoquinone leads to 4,4'-bis(2-methyl-6-tert-butylphenol). When 2,6-dicyclohexylphenol and 3,3',5,5'-tetra-cyclohexyldiphenoquinone are employed, 4,4'-bis-(2, 6-dicyclohexylphenol) is recovered. The use of 2,6-diisopropylphenol and 3,3',5,5'-tetra-isopropyl - diphenoquinone leads to 4,4'-bis(2,6-diisopropylphenol). Likewise, when o-tert-butylphenol and 3,3'-di-tert-butyl-diphenoquinone is used, primarily 4,4'-bis(2-tert-butylphenol) is obtained. Use of 2-methyl-6-tert-eicosylphenol and 3,3'-dimethyl-6,6'-di-tert-eicosyl-diphenoquinone leads to 4,4'-bis (2-methyl-6-tert-eicosylphenol). In like manner, when 2, 6-di-tert-dodecylphenol and 3,3',5,5'-tetra-tert-dodecyl-diphenoquinone is used, 4,4'-bis(2,6-di-tert-dodecylphenol) is obtained.

Example 7

To the reaction vessel of Example 5 is added 2.1 mole parts of 2-tert-decyl-6-tert-octylphenol and one mole part of 3,3'-di-tert-decyl-5,5'-di-tert-octyl - diphenoquinone. There is then added 750 parts of xylene and 55 parts of sodium hydroxide. The vessel is sealed and heated to 200° C. while stirring. It is maintained at this temperature for 4 hours and then cooled and discharged, yielding 4,4'-bis(2-tert-decyl-6-tert-octadecylphenol).

Example 8

To the reaction vessel of Example 5 was added 102 parts of 3,3',5,5'-tetra-tert-butyl-diphenoquinone, 103 parts of 2,6-di-tert-butylphenol, 13 parts of 86 percent potassium hydroxide and 345 parts of toluene. The vessel was sealed and, while stirring, heated to 250° C. It was maintained at this temperature for one hour. It was then cooled to 90° C. and 10.3 parts of 86 percent phosphoric acid was added. After stirring for a short period, the reaction vessel was discharged. On further cooling, 4,4'-bis-(2,6-di-tert-butylphenol) crystallized in 79 percent yield.

Example 9

The procedure of Example 8 was repeated except that the reaction mixture was maintained at 250° C. for 15 minutes. A 94 percent yield was obtained.

In my previous application, Ser. No. 553,024, filed May 26, 1966, I described a two-stage process for making 4,4'- bis(2,6-dihydrocarbylphenols) comprising reacting a phenol having the formula:

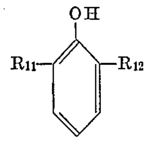

(V)

wherein $R_{11}$ is selected from the group consisting of alpha-branched alkyl radicals containing from about 3 to 20 carbon atoms, alpha-branched aralkyl radicals containing from about 8 to 20 carbon atoms and cycloalkyl radicals containing from about 6 to 20 carbon atoms, and $R_{12}$ is selected from the group consisting of alkyl radicals containing from 1 to 20 carbon atoms, aryl radicals containing from 6 to 20 carbon atoms, aralkyl radicals containing from 7 to 20 carbon atoms and cycloalkyl radicals containing from 6 to 20 carbon atoms, with oxygen in the presence of an alkali metal hydroxide catalyst, at a temperature from about 30 to 300° C., until about 50 mole percent of the phenol is converted to diphenoquinone having the formula:

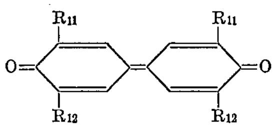

(VI)

wherein $R_{11}$ and $R_{12}$ are the same as above.

Following this first stage of this embodiment of the process, the reactant mixture containing the phenol, diphenoquinone and alkali metal hydroxide is heated to a temperature of about 100 to 500° C. in the substantial absence of oxygen, resulting in the formation of a 4,4′-bis(2,6-dihydrocarbylphenol).

A preferred specie of the above embodiment is the process carried out using 2,6-di-tert-butylphenol as the phenolic reactant and potassium hydroxide as the metal hydroxide, yielding as a final product 4,4′-bis(2,6-di-tert-butylphenol).

The phenols represented by Formula V above are sterically hindered phenols. They have alkyl, aryl, aralkyl, or cycloalkyl groups in both positions ortho to the hydroxyl group and at least one of these radicals is alpha-branched. Some representative phenols are 2-methyl-6-tert-butylphenol, 2-ethyl-6-tert-octylphenol, 2-isopropyl-6-tert-butylphenol, 2-methyl-6-sec-butylphenol, 2-tert - butyl-6-(α-methylbenzyl)phenol, 2-phenyl-6-methylphenol, 2-cyclohexyl-6-methylphenol, 2-sec-cetyl-6-isopropylphenol, and the like.

In the preferred phenols of Formula V, both $R_{11}$ and $R_{12}$ are selected from the group consisting of alpha-branched alkyls containing 3 to 20 carbon atoms, alpha-branched aralkyls containing from 8 to 20 carbon atoms and cycloalkyl radicals containing 6 to 20 carbon atoms. Some examples of these materials are 2,6-diisopropylphenol, 2,6-dicyclohexylphenol, 2,6-sec-butylphenol, 2-isopropyl-6-tert-butylphenol, 2-isopropyl-6-sec-decylphenol, 2-sec-lauryl-6-tert-octadecylphenol, and the like. In the most preferred phenols of Formula V, both $R_{11}$ and $R_{12}$ are tert-alkyl radicals containing from 4 to 20 carbon atoms. Some examples of these are 2,6-di-tert-amylphenol, 2,6-tert-octadecylphenol, 2,6-di-tert-eicosylphenol, 2-tert-butyl-4-(α,α-dimethylbenzyl)phenol, and 2,6 - di-tert-butylphenol. The most preferred phenol of Formula V is 2,6-di-tert-butylphenol.

The first stage of this embodiment is the oxidation of about 50 mole percent of the phenolic reactant to a diphenoquinone. This stage is carried out by passing oxygen or an oxygen-containing gas such as air through the phenol in the presence of an alkali metal hydroxide. The temperature employed in this stage should be high enough to allow the oxidation at a reasonable rate, but not so high as to cause degradation of the reactants or products. A useful temperature range is from about 30 to 300° C. A more preferred range is from about 50 to 150° C. and a most preferred temperature range is from 50 to 100° C.

Although a solvent is not required, it is usually preferred to conduct the reaction in a solvent. This facilitates the reaction because many diphenoquinones have high melting points and would solidify without the solvent. Useful solvents are those that will dissolve the reactants and be substantially inert under the reaction conditions. Some examples of these are alcohols such as methanol, ethanol, isopropanol, butanol, and the like. Also useful are ketone, ethylbutyl ketone, and the like. More preferred solvents are the hydrocarbons such as hexane, isooctane, kerosene, and the like. The most preferred solvents are the aromatic hydrocarbons such as toluene, xylene, mesitylene, and the like. Especially preferred is xylene.

The first stage of this embodiment of the invention can be conducted at atmospheric pressure or at super-atmospheric pressures. A useful pressure range is from about 0 to 1000 p.s.i.g. It is usually preferred to conduct the reaction at above atmospheric pressure. Thus, a useful pressure range is from about 100 to 1000 p.s.i.g. A more prefered pressure range is from about 150 to 500 p.s.i.g., and a most preferred range is from 200 to 500 p.s.i.g.

As in the previous embodiments, the entire process is catalyzed by a single catalyst, making it unnecessary to separate any intermediate product. The amount of alkali metal hydroxide employed should be sufficient to catalyze both stages of the reaction at a reasonable rate. Generally, good results are obtained with from about 0.2 to 2 moles of catalyst per mole of 2,6-dihydrocarbylphenol. A preferred range is from 0.4 to 1 mole of catalyst per mole of the starting phenol. The preferred alkali metal hydroxide is potassium hydroxide.

After about 50 percent of the phenol has been converted to the diphenoquinone, the passage of oxygen through the reaction is stopped and the second stage of the reaction is carried out. This second stage comprises reacting the resultant mixture from the first stage containing the 2,6 - di - hydrocarbylphenol, 3,3′,5,5′-tetrahydrocarbyl diphenoquinone and alkali metal hydroxide at a temperature from about 100 to 500° C. in the substantial absence of oxygen. This second stage is quite similar to the previously-described one-step reaction of a phenol with diphenoquinone. The preferred reaction conditions are the same as in the one-step process.

I have now found that the product quality and yields obtained with this embodiment of my process are likewise improved when the final reaction product is acidified prior to allowing it to contact oxygen. As previously described, enough acid should be added to at least neutralize the alkali metal hydroxide catalyst. Preferably, a slight excess of acid is used. Good results are obtained with from about 1 to 1.5 equivalents of acid per mole of alkali metal hydroxide. The preferred acids are the same as those previously set forth for use in the acidification step.

The following examples illustrate the two-stage process embodiment of this invention. All parts are parts by weight unless otherwise specified.

Example 10

To a pressure reaction vessel equipped with stirrer, temperature measuring means, heating means, gas delivery means and a pressure gauge was added 103 parts of 2,6 - di - tert - butylphenol, 345 parts of toluene and 13 parts of 85 percent potassium hydroxide. The pressure vessel was sealed and heated to 70° C. while stirring. Air was then pased into the vessel below the liquid level at a rate of about 5 cubic feet per hour. Pressure rose as the air entered and the oxygen depleted air was vented at a rate sufficient to maintain a pressure of 300 p.s.i.g. in the vessel. The composition of the reaction was monitored by vapor phase chromatographic analysis of periodic samples, and after one hour, slightly over 50 percent of the 2,6-di-tert-butylphenol had been converted to the 3,3',5,5'-tetra - tert - butyl - diphenoquinone. Air flow was stopped and the vessel was vented. The vessel was again sealed and heated to 250° C. and held at this temperature for 15 minutes. The reaction was then cooled and the product recovered by evaporating off the toluene and recrystallizing the residue, resulting in a 63 percent yield of 4,4'-bis(2,6-di-tert-butylphenol).

Example 11

To the pressure vessel of Example 10 is added 318 parts of 2,6-di-tert-octylphenol, 1000 parts of xylene and 28 parts of potassium tert-butoxide. The vessel is sealed and, while stirring, heated to 100° C. Air is passed into the liquid phase and, when the pressure in the vessel reaches 500 p.s.i.g., the oxygen depleted air is vented at a rate sufficient to maintain 500 p.s.i.g. The progress of the reaction is monitored by vapor phase chromatographic analysis of periodic samples, and when 50 percent of the 2,6 - di - tert - octylphenol has reacted, the air addition is stopped and the vessel vented. It is then resealed and heated to 275° C. and maintained at this temperature for 15 minutes. It is cooled to 100° C. and discharged. Further cooling of the discharged reaction mass yields 4,4'-bis(2,6-di-tert-octylphenol).

In like manner, other phenolic starting materials can be employed in the above example with good results. For example, 2 - tert - butyl - 6-methylphenol yields 4,4'-bis(2 - tert - butyl - 6 - methylphenol). The use of 2,6-diisopropylphenol results in 4,4'-bis(2,6 - diisopropylphenol). The use of 2,6 - di - sec - butylphenol yields 4,4'-bis(2,6 - di - sec - butylphenol). When 2,6 - di(α-methylbenzyl)phenol is used 4,4'-bis[2,6 - di(α - methylbenzyl) phenol] is obtained. The use of 2,6 - dicyclohexylphenol results in 4,4'-bis(2,6 - dicyclohexylphenol). The use of 2 - cyclohexyl - 6 - methylphenol yields 4,4'-bis(2-cyclohexyl - 6 - methylphenol). In like manner, 2,6-di-tert-octadecylphenol results in 4,4'-bis(2,6 - di - tert - octadecylphenol). Similarly, other alkali metal hydroxides can be employed in the above example with good results.

Example 12

In the reaction vessel of Example 10 is placed 206 parts of 2,6-di-tert-butylphenol, 26 parts of 86 percent potassium hydroxide and 300 parts of xylene. The vessel is sealed and heated to 100° C., while stirring. Air is then passed through the reaction mixture while maintaining the vessel pressure at 500 p.s.i.g. by controlled venting. When 48 percent of the 2,6-di-tert-butylphenol has been oxidized, as shown by gas chromatographic analysis, the air flow is stopped and the reaction mixture heated to 270° C. After 30 minutes at this temperature the mixture is cooled to 100° C. and 60 parts of 85 percent phosphoric acid dissolved in 100 parts of water is added. The mixture is stirred for 5 minutes and then discharged. The reaction product is cooled to 10° C. and the product, 4,4'-bis(2,6-di-tert-butylphenol) crystallizes and is recovered by filtration.

In the above example, good results are also obtained with other phenols. For example, 6 - tert - butyl-o-cresol yields 4,4' - bis(2 - methyl-6-tert-butylphenol). Likewise, 2,6 - dicyclohexylphenol yields 4,4' - bis(2,6 - dicyclohexylphenol). In like manner, 2,6 - di - (α-methylbenzyl) phenol results in 4,4' - bis[2,6 - di(α - methylbenzyl)-phenol]. Furthermore, 2,6 - di - tert - dodecylphenol gives 4,4' - bis(2,6 - di - tert - dodecylphenol). Also, 2 - sec-eicosyl - 6 - (2,4 - di - tert - butylphenyl)phenol yields 4,4' - bis[2 - sec - eicosyl - 6 - (2,4-di-tert-butylphenyl) phenol].

Example 13

In the reaction vessel of Example 10 is placed 258 parts of 2,6-dicyclohexylphenol, 65 parts of 86 percent potassium hydroxide and 150 parts of xylene. While stirring, the vessel is heated to 90° C. and air passed through the reaction mixture at 1000 p.s.i.g. until about 50 percent of the 2,6-cyclohexylphenol has been reacted. The air is then discontinued and the mixture is heated to 300° C. and maintained at this temperature for 30 minutes. It is then cooled to 100° C. and a solution of 65 parts of glacial acetic acid in 200 parts of water is added. The mixture is stirred 10 minutes and then discharged. On cooling, 4,4'-bis(2,6-dicyclohexylphenol) crystallizes in good yield.

Good results are obtained in the above procedure when other acids such as hydrochloric or sulfuric are employed in the acidification step.

As stated previously, the bisphenols made by this process are very useful as antioxidants. Their usefulness was demonstrated in Polyveriform Tests. In these tests, 100 ml. samples of neutral oil containing 0.05 percent iron, as ferric-2-ethylhexoate, and 0.1 percent lead bromide were prepared. To these was added one weight percent of 4,4'-bis(2,6-di-tert-butylphenol) and the samples heated to 300° F. Air was passed through the heated samples at a rate of 48 liters per hour, over a period of 20 hours. After this, the viscosity index and acid number of the oil sample was determined. The viscosity had increased only 66 percent and the acid number was only 3.7, showing that the oil had been effectively stabilized. Even better stabilization is obtained when 4,4'-bis(2,6-di-tert-butylphenol) is added to rubber. Tests have been carried out showing this compound to be superior to many commercial antioxidants.

I claim:

1. A process for making 4,4'-bis(2,6-di-hydrocarbylphenols), said process comprising:

(A) reacting one mole equivalent of a first phenol having the formula:

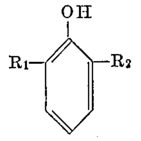

wherein $R_1$ and $R_2$ are radicals selected from the group consisting of alkyl radicals containing from 1 to 20 carbon atoms, aryl radicals containing from 6 to 14 carbon atoms, aralkyl radicals containing from 8 to 9 carbon atoms, and cyclohexyl with an oxygen-containing gas in the presence of an alkali metal hydroxide at a temperature of from about 30 to 300° C. until substantially all of said first phenol has been oxidized;

(B) adding to the reaction mixture of said first phenol about one mole equivalent of a second phenol having the formula:

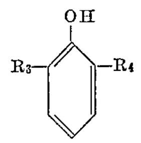

wherein $R_3$ and $R_4$ are selected from the same group as $R_1$ and $R_2$;

(C) heating the mixture to a temperature of from about 100 to 350° C. in the substantial absence of oxygen and maintaining said mixture at said temperature until a reaction product containing a substantial amount of a 4,4' - bis(2,6-di-hydrocarbylphenol) is formed; and (D) recovering said 4,4' - bis(2,6 - di-hydrocarbylphenol) from said reaction product.

2. The process of claim 1 wherein said first phenol and said second phenol are the same phenol.

3. The process of claim 2 wherein said first phenol and said second phenol are 2,6-di-tert-butylphenol and wherein said alkali metal hydroxide is potassium hydroxide.

4. The process of claim 1 wherein an acid selected from the group consisting of mineral acids, formic, acetic and propionic acids and p-toluene sulfonic acids is added to said reaction product in an amount sufficient to at least neutralize said alkali metal hydroxide after a substantial amount of said 4,4'-bis(2,6-dihydrocarbylphenol) is formed and before allowing said reaction product to contact oxygen.

5. The process of claim 4 wherein said first phenol and said second phenol are 2,6-di-tert-butylphenol and said alkali metal hydroxide is potassium hydroxide.

6. The process of claim 5 wherein said reaction product is acidified with an acid selected from the group consisting of acetic acid and phosphoric acid.

7. The process of claim 6 wherein said acid is phosphorus acid.

8. In a process for making a bisphenol, said process comprising reacting a phenol having the formula:

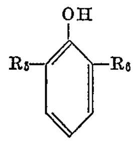

wherein $R_5$ and $R_6$ are radicals selected from the group consisting of alkyl radicals containing from 1 to 20 carbon atoms, aryl radicals containing from 6 to 14 carbon atoms, aralkyl radicals containing from 8 to 9 carbon atoms, and cyclohexyl, with a diphenoquinone having the formula:

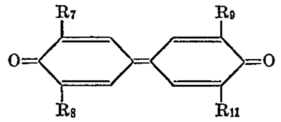

wherein $R_7$, $R_8$, $R_9$ and $R_{10}$ are selected from the same group as $R_5$ and $R_6$, in the presence of an alkali metal hydroxide catalyst at a temperature of from about 100 to 500° C. in a substantially oxygen-free system to form a reaction product containing a substantial amount of 4,4'-bis(2,6-di-hydrocarbylphenol) and then recovering said 4,4'-bis(2,6-di-hydrocarbylphenol); the improvement comprising adding sufficient acid selected from the group consisting of mineral acids, formic, acetic and propionic acids and p-toluene sulfonic acids to at least neutralize said alkali metal hydroxide after a substantial amount of said 4,4'-bis(2,6-di-hydrocarbylphenol) has formed and prior to allowing said reaction product to contact oxygen.

9. The process of claim 8 wherein $R_5$, $R_6$, $R_7$, $R_8$, $R_9$ and $R_{10}$ are the tert-butyl group and said alkali metal hydroxide is potassium hydroxide.

10. The process of claim 9 wherein said acid is selected from the group consisting of acetic acid and phosphoric acid.

11. The process of claim 10 wherein said acid is phosphoric acid.

12. In a process for making 4,4'-bis(2,6-dihydrocarbylphenol), said process comprising:

(A) reacting a phenol having the formula:

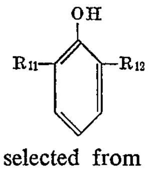

wherein $R_{11}$ is selected from the group consisting of alpha-branched alkyl radicals containing from 3 to 20 carbon atoms, alpha-branched aralkyl radicals containing from 8 to 9 carbon atoms and cyclohexyl, and $R_{12}$ is selected from the group consisting of alkyl radicals containing from 1 to 20 carbon atoms, aryl radicals containing from 6 to 14 carbon atoms, aralkyl radicals containing from 8 to 9 carbon atoms, and cyclohexyl with oxygen in the presence of an alkali metal hydroxide at a temperature of from about 30 to 300° C., until about 50 mole percent of said phenol is converted to a diphenoquinone having the formula:

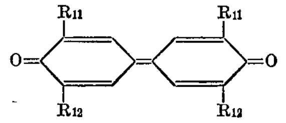

wherein $R_{11}$ and $R_{12}$ are the same as above, and (B) reacting the mixture containing said phenol, diphenoquinone and alkali metal hydroxide at a temperature of from about 100 to 500° C. in the substantial absence of oxygen until a reaction product containing a substantial amount of 4,4'-bis(2,6-di-hydrocarbylphenol) is formed and then recovering said 4,4'-bis(2,6-di-hydrocarbylphenol); the improvement comprising adding sufficient acid selected from the group consisting of mineral acids, formic, acetic and propionic acids and p-toluene sulfonic acids to at least neutralize said alkali metal hydroxide after said substantial amount of 4,4'-bis(2,6-di-hydrocarbylphenol) has formed and prior to allowing said reaction product to contact oxygen.

13. The process of claim 12 wherein said phenol is 2,6-di-tert-butylphenol and said alkali metal hydroxide is potassium hydroxide.

14. The process of claim 13 wherein said acid is selected from the group consisting of acetic acid and phosphoric acid.

15. The process of claim 14 wherein said acid is phosphoric acid.

16. A process for making 4,4'-bis(2,6-di-hydrocarbylphenol) comprising (A) reacting a phenol having the formula:

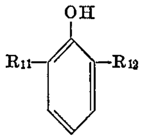

wherein $R_{11}$ is selected from the group consisting of alpha-branched alkyl radicals containing from 3 to 20 carbon atoms, alpha-branched aralkyl radicals containing from 8 to 9 carbon atoms and cyclohexyl, and $R_{12}$ is selected from the group consisting of alkyl radicals containing from 1 to 20 carbon atoms, aryl radicals containing from 6 to 14 carbon atoms, aralkyl radicals containing from 8 to 9 carbon atoms and cyclohexyl, with oxygen in the presence of an alkali metal hydroxide at a temperature of from about 30–300° C., until about 50 mole percent of said phenol is converted to a diphenoquinone having the formula:

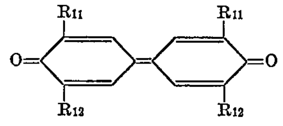

wherein $R_{11}$ and $R_{12}$ are the same as above, and (B) reacting the mixture containing said phenol, diphenoquinone and alkali metal hydroxide at a temperature of from about 100 to 500° C. in the substantial absence of oxygen until a reaction product containing a substantial amount of 4,4'-bis(2,6-di-hydrocarbylphenol) is formed and then recovering said 4,4'-bis(2,6-di-hydrocarbylphenol).

17. The process of claim 16 wherein $R_{11}$ and $R_{12}$ are tert-butyl radicals, said alkali metal hydroxide is potassium hydroxide, said temperature in Step (A) is from about 50–150° C., and said temperature in Step (B) is from about 200–300° C.

18. A process for making a bisphenol comprising reacting a phenol having the formula:

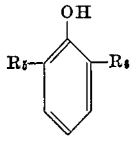

wherein $R_5$ and $R_6$ are radicals selected from the group consisting of alkyl radicals containing from 1 to 20 carbon atoms, aryl radicals containing from 6 to 14 carbon atoms, aralkyl radicals containing from 8 to 9 carbon atoms, and cyclohexyl, with a diphenoquinone having the formula:

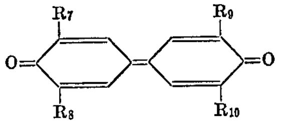

wherein $R_7$, $R_8$, $R_9$ and $R_{10}$ are selected from the same group as $R_5$ and $R_6$, in the presence of an alkali metal hydroxide catalyst at a temperature of from about 100 to 500° C. in a substantially oxygen-free system to form a reaction product containing a substantial amount of 4,4'-bis(2,6-di-hydrocarbylphenol) and then recovering said 4,4'-bis(2,6-di-hydrocarbylphenol).

19. The process of claim 18 wherein $R_5$, $R_6$, $R_7$, $R_8$, $R_9$ and $R_{10}$ are tert-butyl radicals, said alkali metal hydroxide is potassium hydroxide, and said temperature is from about 200 to 300° C.

References Cited

UNITED STATES PATENTS

| | | | |
|---|---|---|---|
| 2,905,674 | 9/1959 | Filbey | 260—396 |
| 3,153,098 | 10/1964 | Boag | 260—620 |
| 3,262,982 | 7/1966 | Hay | 260—620 |

OTHER REFERENCES

Hay, A.: Tetrahedron Letters, No. 47, pp. 4241–43 (1965).

BERNARD HELFIN, Primary Examiner

N. P. MORGENSTERN, Assistant Examiner

U.S. Cl. X.R.

260—396

PO-1050
(5/69)

UNITED STATES PATENT OFFICE
CERTIFICATE OF CORRECTION

Patent No. 3,562,338 Dated February 9, 1971

Inventor(s) Edward F. Zaweski

It is certified that error appears in the above-identified patent and that said Letters Patent are hereby corrected as shown below:

Column 13, Claim 7, lines 19-20, "phosphorus" should read -- phosphoric --; Claim 8, in the second formula, that porti of the formula reading $R_{11}$ should read $R_{10}$ Signed and sealed this 18th day of May 1971.

(SEAL)
Attest:
Attest:

EDWARD M.FLETCHER,JR.
Attesting Officer

WILLIAM E. SCHUYLER, J
Commissioner of Patent